3,258,426
DISPERSING COLLOIDAL CARBONATES IN OILS
Ulric B. Bray, Pasadena, and Vanderveer Voorhees, Los Altos, Calif., assignors to Bray Oil Company, Los Angeles, Calif., a limited partnership
No Drawing. Filed Sept. 29, 1964, Ser. No. 400,250
8 Claims. (Cl. 252—33)

This application is a continuation-in-part of Serial No. 251,127 filed January 14, 1963, now abandoned and continued as Serial No. 443,768.

This invention relates to dispersions of calcium carbonate in oils, particularly colloidal dispersions in which the particle size is below approximately 0.1 micron, and to a process of making these dispersions. The invention relates more particularly to the manufacture of lubricating oils containing dispersions of calcium carbonate in which the particles are sufficiently small that the oils are transparent to the unaided eye.

In the lubrication of internal combustion engines and other machinery, it has been found that the formation of sludge deposits is associated with the oxidation of the oil and is accelerated by various catalysts, particularly acids formed in the oil from oxidation or acids which are absorbed by the oil, e.g., from the combustion of sulphur and halogen compounds in internal combustion engine fuels. It has also been found that if the acids are neutralized immediately, the rate of sludge formation can be greatly reduced so that the useful life of the oil in the engine is extended far beyond that of the oil when not protected by neutralizing agents. It has also been found that the polyvalent metal carbonates, and particularly calcium carbonate, are the most satisfactory neutralizing agents for the purpose, because of their high water insolubility and the fact that they react neutral but are capable of neutralizing all acids encountered in lubricating oils which are stronger than carbonic acid. They are therefore considered to possess "reserve alkalinity."

In order to utilize the valuable protective properties of calcium carbonate, for example, it is necessary that it be dispersed in the oil in such a fine state of subdivision that it will not interfere with the operation of machinery in which the oil is employed as a lubricant. This necessitates that the particle size be sufficiently small that the oil will be transparent to visible light and readily filterable through ordinary filtering media, such as filter paper and the oil filters of automotive engines. When larger particles are present in the oil, making the oil cloudy or murky, there is danger that abrasion of bearing surfaces will result and coarse particles may even settle out of the oil on long standing.

Several methods have been proposed for dispersing calcium carbonate in oils. One such process is disclosed in the patent of Warren et al. 2,839,470, according to which an emulsion of calcium hydroxide and lubricating oil is prepared in the presence of water and an emulsifying agent and then treated with carbon dioxide. This process is beset by the difficulty of obtaining sufficiently small uniform particles of carbonate, filtration problems and the limited amount of carbonate which can be introduced into the oil in this manner. Thus it is difficult to obtain an alkali value by this process above about 100.

In our copending application Serial No. 251,127, now abandoned, we have described a method of dispersing calcium carbonate in oil by first preparing an emulsion of oil and calcium carbamate, then converting the latter to carbonate on heating. The calcium carbamate is made by interaction of calcium hydroxide and ammonium carbamate. Subsequently, the oil is dehydrated and filtered free of contaminating solids, dirt, etc.

We have found that, when using this method however, filtration of the oil is frequently difficult or impossible, owing to formation of calcium carbonate particles in the range of 1 to 10 microns and coarser as a side reaction difficult to control. We have now discovered that these undesired coarse particles can be retained in an emulsion and separated from the oil phase by taking advantage of the density difference of the two phases. Settling or centrifugal separation can be employed. The emulsion obtained is of the water-in-oil type and can be treated with hydrocarbon solvent in a separate step to recover further amounts of oil and colloidal calcium carbonate. The emulsion is then stripped free of solvent by heating before discarding.

During the heating step prior to separation of the emulsion phase, most of the ammonia is evolved as a vapor which can be recovered easily by absorption in cold water. The resulting aqua ammonia can then be used again to form carbamate by treating with carbon dioxide.

Several methods can be employed for carrying out the process. Thus, the line can be dispersed in the oil and emulsifying agent in the presence of ammonia and water and then carbon dioxide can be introduced into the emulsion until sufficient to convert all or nearly all the lime to carbonate. Or the lime can be dispersed in the oil and emulsifying agent either in the presence of water or dry, and thereafter a solution of ammonia saturated with carbon dioxide can be added. This solution can be readily prepared by injecting carbon dioxide into concentrated aqueous ammonia containing about 28 to 30% $NH_3$ with cooling to remove the heat of neutralization until no more carbon dioxide is absorbed. It is desirable to keep the temperature below 120° F. at this stage, preferably below 100° F. The solution prepared in this way appears to be principally ammonium carbamate, as it gives no precipitate with calcium chloride immediately but only on standing as the carbamate rearranges to the carbonate.

In an alternative method of carrying out the process, the reaction product of ammonia and carbon dioxide is dispersed in the oil in the presence of an emulsifying agent, either dry or in the presence of water and/or ammonia. To this mixture lime is then added with good agitation, either dry or mixed with water and/or ammonia. As soon as the emulsion is thoroughly homogenized, it is ready for dehydration and conversion to the colloidal calcium carbonate dispersion. On heating it usually disengages gas at a temperature of upwards of 150° F. The emulsion is heated to about 180 to 200° F.—sufficient to decompose the calcium carbamate formed by metathesis between the lime and ammonium carbamate according to the reaction:

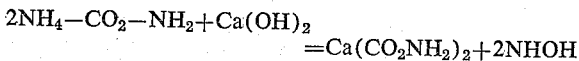

On heating, the calcium carbamate is converted to the calcium carbonate by the reaction:

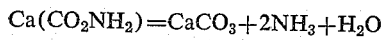

Another method of carrying out the reaction is to mix the calcium hydroxide or oxide with aqueous ammonia and inject carbon dioxide into the mixture until approximately the stoichiometric amount equivalent to the hydroxide has been absorbed, then mix the resulting slurry with oil and emulsifying agent to give a creamy emulsion which is then heated and dehydrated to give the desired oil dispersion. There appears to be an advantage to slaking the calcium oxide with concentrated aqueous ammonia in which case a calcium amine or basic amine appears to form. The resulting lime slurry is more effective when converted to carbamate and carbonate, giving a high yield of colloidal carbonate with less of the crystalline carbonate.

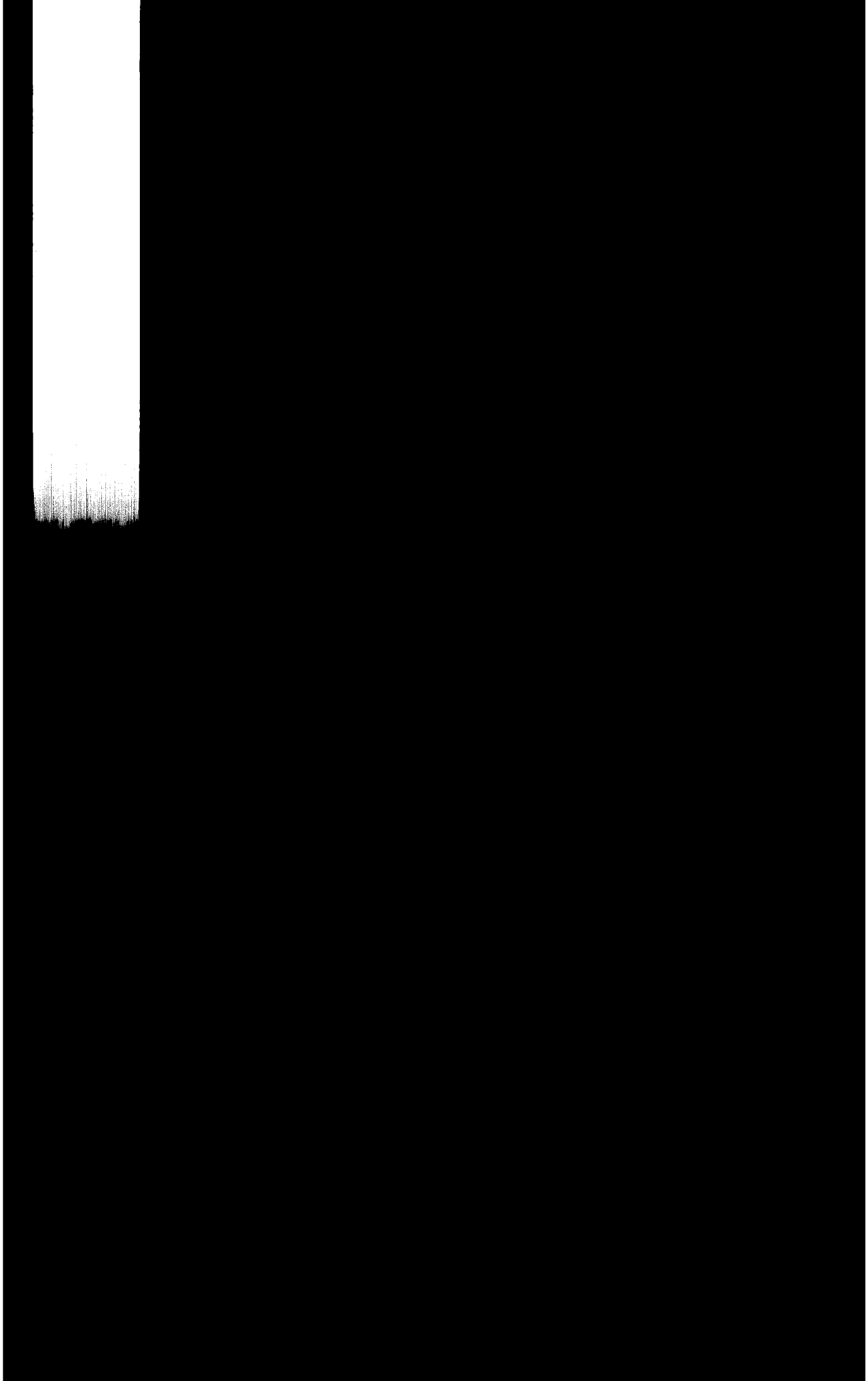

This heating operation can be conveniently done by means of solvent vapor. The emulsion then passes to a continuous centrifuge to separate the aqueous emulsion from the oil phase and the latter is stripped free of solvent to yield the desired carbonate dispersion.

In general, we employ sufficient water in our process to provide sufficient emulsion phase to absorb all coarse, non-colloidal micelles within the visible range. We may employ 0.5 to 5 volumes of water per volume of oil and emulsifying agent used in the reaction. We also prefer to use about 0.5 to 4 volumes of solvent per volume of oil and dispersant. The water should be saturated with $NH_3$, preferably before slaking the lime therein, and, in general we prefer to use water containing at least 10% of $NH_3$.

The lime, preferably CaO, is usually employed in the amount of 10 to 40% based on the weight of oil and sulfonate. Carbon dioxide is employed in an amount less than the chemical equivalent of the lime, usually about 75 to 95% of the weight of lime on a molecular basis.

We have found that the addition of a small amount of urea, usually 1 to 5% based on the weight of oil and sulfonate, serves to stabilize the carbamate and prevent the formation of coarse, non-colloidal micelles. It can be added directly to the aqua ammonia before carbonation or it can be added to the lime slurry. The ammonia water can be divided into two portions, one of which is carbonated to form the carbamate and the other of which is employed to slake calcium oxide and give a slurry of calcium ammonium hydrate which is then mixed with the ammonium carbamate solution and emulsified with the oil and emulsifying agent.

The following examples will illustrate the application of our invention to the dispersion of collodial calcium carbonate in lubricating oil. The calcium oxide employed was a commercial quicklime made by roasting limestone at a temperature above about 2000° F. and grinding to pass 300 mesh. It analyzed about 95% CaO.

*Example 1*

Twenty-five grams of powdered calcium oxide were slaked in 200 cc. concentrated ammonium hydroxide by allowing it to digest for 20 minutes at 92° F. The slurry was cooled to 88° F., then carbonated in a turbine mixer with a stream of $CO_2$ flowing at a rate of 2.3 liters per min. for 4 minutes. This is approximately 0.41 mol and is about equivalent chemically to the lime—0.42 mol, allowing for 5% impurity. The temperature rose to 118°. To the mixture was then immediately added 100 gm. of a lubricating oil solution of calcium mahogany sulfonate containing about 40% of sulfonate prepared by sulfonation of lubricating oil as described in U.S. Patent No. 2,453,690. This oil was diluted with 200 cc. of petroleum xylene to facilitate mixing.

After mixing 15 minutes, the emulsion was heated to 196° F., then settled in a separatory funnel. Within an hour it had separated into two sharply defined layers: a clear oil-solvent layer above and an emulsion below. The emulsion was drawn off and weighed 170 gm. The oil layer was heated to 400° F. to remove solvent and water, giving a clear oil having an alkali value of 28 (phth.) and 260 (m.o.).

*Example 2*

Fifty grams (0.833 mol.) of calcium oxide, technical grade, powdered to pass 300 mesh, was slaked ten minutes in 300 cc. $NH_4OH$ concentrated (30% $NH_3$). From 100° F. the slurry was cooled to 80° F., then carbonated in a turbine mixer with a stream of $CO_2$ gas flowing at the rate of 2.3 liters per minute for seven minutes (0.72 mol.). The temperature rose to 129° F. during carbonation. Two hundred grams of 40% calcium mahogany sulfonate-oil solution was then added, diluted with 400 cc. petroleum xylene solvent. The emulsion was mixed for 15 minutes while the temperature fell to 118° F., then heated to 196° over a period of 40 minutes. Effervescing at 150–160° indicated evolution of $NH_3$. After settling 50 minutes, an emulsion layer—296 grams—was drawn off and extracted twice with 200° boiling point naphtha. The extract, on evaporation to 400° F. yielded 50 grams of a clear oil having an alkali value of 20 (phth.) and 255 (m.o.).

The clear oil layer was stripped to 400° F. and filtered hot to remove accidental dirt. The yield was 150 gm. Alkali value—20 (phth.) and 280 (m.o.).

*Example 3*

Thirty grams (.50 mol.) of calcium oxide were slaked in 150 cc. water, cooled, then saturated with $NH_3$ at 60° F. The slurry was carbonated in a turbine mixer for 8 minutes with a stream of $CO_2$ flowing at 1.25 liters per minute (.45 mol.). The temperature rose from 45° F. to 108° F. To the mixture was added immediately, 100 gm. oil-sulfonate diluted with 200 cc. xylene solvent. The emulsion was mixed 15 minutes, then heated to 195° F. to expel ammonia. After settling an hour, the emulsion layer was discarded and the oil layer, not entirely clear, was dehydrated to 250° F. and filtered in solution with Hyflo and Standard Super Cel. The filter rate was slow. The filtrate was stripped to 400° F., and the clear oil titrated. Alkali value—15 (phth.) 190 (m.o.). This experiment indicates that slaking calcium oxide in water is less effective than slaking in ammonium hydroxide.

*Example 4*

Thirty grams of calcium oxide were slaked 20 minutes in 200 cc. concentrated ammonium hydroxide (30%), then saturated with $NH_3$ gas at 60° F. $CO_2$ was passed in at a rapid rate for 2½ minutes while mixing thoroughly, starting at 30° F. and stopping at 94° F. Then were added 100 grams oil containing 40% of calcium mahogany sulfonate, diluted with 300 cc. xylene solvent. The emulsion was heated to 196° F. and divided into two portions.

One portion was centrifuged immediately into a clear oil layer, an emulsion layer with sediment, and an intermediate clear water layer. The oil layer was evaporated to 400° F., leaving a clear lubricating oil having an alkali value of 35 (phth.) and 245 (m.o.). It gave a clear dilution in 200 naphtha.

The remaining portion was settled overnight, giving a clear oil layer and an emulsion layer below. The oil layer was filtered rapidly, then stripped free of solvent at 400° F. The product was a clear oil having an alkali value of 36 (phth.) and 245 (m.o.). These results show that centrifuging and settling are equivalent and that no degradation of the colloidal calcium carbonate dispersion occurred on standing overnight.

*Example 5*

Thirty grams of calcium oxide were slaked 20 minutes in 200 cc. concentrated $NH_4OH$. To the slurry was then added 5 grams urea as a stabilizer to prevent the conversion of carbamate to carbonate. $CO_2$ was then introduced at the rate of 3.4 liters per minute for 3 minutes while vigorously mixing. The temperature rose during carbonation from 86° F. to 123° F. After carbonation there was added immediately 100 grams mahogany sulfonate-oil solution (40%) diluted with 300 cc. xylene solvent. The emulsion was mixed ten minutes, then heated to 196° F. to eliminate most of the ammonia. On settling overnight, it was found to have settled into a clear oil layer and an emulsion layer with a layer of clear water separating them. The oil layer was removed, stripped of solvent at 400° F., then filtered rapidly with Hyflo to remove accidental dirt. Alkali value—12 (phth.) 320 (m.o.). These results indicate urea to be of value in stabilizing the carbamate and preventing undesired conversion to crystalline carbonate.

Example 6

Thirty grams of calcium oxide were slaked in 100 cc. of concentrated aqueous ammonia for 30 minutes. To this slurry was added 100 cc. more aqueous ammonia and 50 cc. water. Xylene solvent—200 cc.—was then added and the mixture carbonated in a turbine mixer with a stream of $CO_2$—3.4 liters per minute for 2.5 minutes. The temperature rose from 66° to 115° F. To the mixture was then immediately added 100 grams lubricating oil containing 40% mahogany sulfonate diluted with 100 cc. xylene solvent. After 10 minutes of further mixing, the mixture was heated to 200° F. and settled rapidly into a clear top oil layer and an emulsion bottom layer.

A portion of the emulsion layer was centrifuged 15 minutes, separating into three layers: a clear oil layer, a clear water layer and a compact sediment with no "cuff" at the interface between oil and water. The oil was decanted and stripped to 400° F. It was filtered hot— very fast, giving an oil having an alkali value of 33 (phth.) and 325 (m.o.). Analysis of the cake showed 95.5% $CaCO_3$ by titration.

Example 7

Into a steel mixing vessel of 1 barrel capacity equipped with a rotating agitator, bottom outlet, vapor line and jacket for water cooling or steam heating, were introduced 5 gallons of concentrated aqueous ammonia, 250 grams of urea and 10 lbs. of calcium oxide powder (0.166 lb. mol.). After slaking for 1 hour, there was introduced with stirring and cooling, 6 pounds of $CO_2$ (0.137 lb. mol.). The temperature rose to 121° F. Five gallons (40 lbs.) of oil and sulfonate (40%) were then added, diluted with 10 gallons of xylene solvent. Mixing was continued for 30 minutes, then the reaction was heated by the steam jacket to 195° F. On settling overnight, an aqueous emulsion separated at the bottom where it was drawn off in the amount of 7 gallons. Extraction of this emulsion layer with 5 gallons xylene solvent gave a clear oil having an alkali value of 45 (phth.) and 290 (m.o).

The clear oil layer was stripped free of solvent at 400° F., giving a clear oil having an alkali value of 40 (phth.) and 300 (m.o.).

Although we have described our invention by means of a series of examples, we intend that it be not limited by the procedures set forth therein. It is clear from the foregoing description that the invention extends to any system wherein an emulsion of calcium carbamate is formed in the presence of ammonium carbamate and thereafter converted to carbonate by heating in the presence of oil and an emulsifying agent of the water-in-oil type. The sequence of mixing aqua ammonia, carbon dioxide, lime and oil is not important, it being essential to have sufficient water in the emulsion to form an aqueous phase which can be separated from the oil by its difference in density. Solvent extract of the aqueous phase can be employed in the treatment of more oil.

Having thus described our invention, what we claim is:

1. The process of making transparent dispersions in oil of colloidal calcium carbonate which comprises preparing an aqueous emulsion of ammonium carbamate, calcium hydroxide, oil and an oil soluble emulsifying agent of the water-in-oil type, by adjusting the reaction mixture to contain, for each volume of oil and emulsifying agent, from 0.5 to 5 volumes of water containing at least 10° of ammonia by weight, including that contained in said carbamate, from 10 to 40% by weight, based on oil and emulsifying agent, of lime calculated as calcium oxide, and ammonium carbamate equivalent to about 75 to 95% of said lime on a molar basis, heating the emulsion to a temperature above the decomposition temperature of the carbamate but below the boiling point of water, separating the emulsion into a clear oil phase and a heavier aqueous emulsion phase containing calcium carbonate particles of 1–10 microns and coarser, by virtue of the difference in density of the two phases and recovering oil and dispersed calcium carbonate from said oil phase.

2. The process of claim 1 wherein the calcium hydroxide is prepared by slaking calcium oxide with ammonium hydroxide.

3. The process of claim 1 wherein the aqueous emulsion phase is separated from the oil phase by gravity settling.

4. The process of claim 1 wherein the aqueous emulsion phase is separated from the oil phase by centrifugal force.

5. The process of claim 1 wherein a small stabilizing amount of urea, about 1 to 5% based on the calcium hydroxide employed, is added to said ammonium carbamate.

6. The process of making a transparent dispersion in oil of colloidal calcium carbonate particles less than 0.1 micron, substantially free of coarser particles, which comprises slaking calcium oxide in concentrated aqueous ammonia, introducing carbon dioxide into the resulting slurry of calcium hydroxide, ammonia and water, to form ammonium carbamate and calcium carbamate in aqueous solution, emulsifying said carbamate solution with oil containing an emulsifying agent of the water-in-oil type, adjusting the reaction mixture to contain, for each volume of oil and emulsifying agent, from 0.5 to 5 volumes of water containing at least 10% of ammonia by weight, and from 10 to 40% by weight, based on oil and emulsifying agent, of lime calculated as calcium oxide, heating the emulsion to a temperature sufficient to convert the calcium carbamate to carbonate but below the boiling point of water, separating the mixture by gravity into a clear oil phase and an aqueous emulsion phase containing particles coarser than 0.1 micron, and recovering oil and colloidally dispersed calcium carbonate from the oil phase.

7. The process of claim 6 wherein the amount of carbon dioxide used is between 75 and 95 percent of the calcium oxide on a molar weight basis.

8. The process of claim 6 wherein the oil and emulsifying agent is diluted with 0.5 to 4 volumes of a volatile hydrocarbon solvent.

References Cited by the Examiner

UNITED STATES PATENTS

| | | |
|---|---|---|
| 2,595,556 | 5/1952 | Worth et al. |
| 3,014,866 | 12/1961 | Ferm _____ 252—33 |
| 3,126,340 | 3/1964 | Sabol et al. _____ 252—18 |

DANIEL E. WYMAN, *Primary Examiner.*

E. W. GOLDSTEIN, P. P. GARVIN,
*Assistant Examiners.*